United States Patent
Kijima

(10) Patent No.: US 12,241,846 B2
(45) Date of Patent: *Mar. 4, 2025

(54) DETECTION APPARATUS, DETECTION METHOD, EXPOSURE APPARATUS, EXPOSURE SYSTEM, AND ARTICLE MANUFACTURING METHOD

(71) Applicant: CANON KABUSHIKI KAISHA, Tokyo (JP)

(72) Inventor: Kazuya Kijima, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,152

(22) Filed: Oct. 2, 2023

(65) Prior Publication Data

US 2024/0027365 A1    Jan. 25, 2024

Related U.S. Application Data

(63) Continuation of application No. 17/536,489, filed on Nov. 29, 2021, now Pat. No. 11,835,470.

(30) Foreign Application Priority Data

Dec. 8, 2020    (JP) .................................. 2020-203655

(51) Int. Cl.
    *G01N 21/95*    (2006.01)
    *G06T 7/11*    (2017.01)
    *G01N 21/88*    (2006.01)

(52) U.S. Cl.
    CPC ............ *G01N 21/9501* (2013.01); *G06T 7/11* (2017.01); *G01N 2021/8864* (2013.01); *G06T 2207/30148* (2013.01)

(58) Field of Classification Search
    CPC ........ G01N 21/9501; G01N 2021/8864; G06T 7/11; G06T 2207/30148;
(Continued)

(56) References Cited

U.S. PATENT DOCUMENTS

| 5,521,036 A | 5/1996 | Iwamoto et al. |
| 8,384,878 B2 * | 2/2013 | Sato ...................... G03F 9/7084 |
| | | 355/72 |

(Continued)

FOREIGN PATENT DOCUMENTS

| JP | H09180996 A | 7/1997 |
| JP | H1022211 A | 1/1998 |

(Continued)

OTHER PUBLICATIONS

Office Action issued in U.S. Appl. No. 17/536,489 mailed Jul. 7, 2023.

(Continued)

*Primary Examiner* — Hung V Nguyen
(74) *Attorney, Agent, or Firm* — ROSSI, KIMMS & McDOWELL LLP

(57) ABSTRACT

A detection apparatus for detecting a mark formed on a substrate uses a detection optical system that irradiates light on the mark on the substrate held by a stage and detects an image of the mark, and a processor that performs a detection process of the mark based on the image of the mark. The processor finds a detection value indicating a position of the mark in an observation field of the detection optical system based on the image of the mark, finds a subregion in which the mark is located among a plurality of subregions in the observation field, and corrects the detection value based on a correction value corresponding to the found subregion among correction values predetermined for the plurality of subregions, respectively.

9 Claims, 10 Drawing Sheets

(58) Field of Classification Search
CPC ............. G06T 2207/30204; G06T 7/73; G03F 9/7049; G03F 7/70491; G03F 9/7088; G03F 9/7019; G03F 9/7026; H01L 21/027

See application file for complete search history.

(56) References Cited

U.S. PATENT DOCUMENTS

| | | | |
|---|---|---|---|
| 10,747,116 | B2 | 8/2020 | Fujishima |
| 10,943,343 | B2 | 3/2021 | Murayama |
| 11,835,470 | B2 * | 12/2023 | Kijima .................. G06T 7/73 |
| 2003/0235330 | A1 | 12/2003 | Tanaka |
| 2015/0362842 | A1 | 12/2015 | Ogawa et al. |
| 2020/0264513 | A1 | 8/2020 | Yamamoto et al. |

FOREIGN PATENT DOCUMENTS

| | | | |
|---|---|---|---|
| JP | 2005285916 A | 10/2005 |
| TW | 202036181 A | 10/2020 |
| TW | 202043933 A | 12/2020 |

OTHER PUBLICATIONS

Notice of Allowance issued in U.S. Appl. No. 17/536,489 mailed Oct. 19, 2023.
Corrected Notice of Allowability issued in U.S. Appl. No. 17/536,489 mailed Oct. 25, 2023.
Office Action issued in Taiwanese Appln. No. 110142757 mailed Mar. 22, 2024. English translation provided.

* cited by examiner

FIG. 8

| GAP 4 | GAP 3 | GAP 2 | GAP 1 |
|---|---|---|---|
| GAP 5 | GAP 6 | GAP 7 | GAP 8 |
| GAP 12 | GAP 11 | GAP 10 | GAP 9 |

×

| DEFOCUS CHARAC- TERISTIC 4 | DEFOCUS CHARAC- TERISTIC 3 | DEFOCUS CHARAC- TERISTIC 2 | DEFOCUS CHARAC- TERISTIC 1 |
|---|---|---|---|
| DEFOCUS CHARAC- TERISTIC 5 | DEFOCUS CHARAC- TERISTIC 6 | DEFOCUS CHARAC- TERISTIC 7 | DEFOCUS CHARAC- TERISTIC 8 |
| DEFOCUS CHARAC- TERISTIC 12 | DEFOCUS CHARAC- TERISTIC 11 | DEFOCUS CHARAC- TERISTIC 10 | DEFOCUS CHARAC- TERISTIC 9 |

=

| CORRECTION VALUE 4 | CORRECTION VALUE 3 | CORRECTION VALUE 2 | CORRECTION VALUE 1 |
|---|---|---|---|
| CORRECTION VALUE 5 | CORRECTION VALUE 6 | CORRECTION VALUE 7 | CORRECTION VALUE 8 |
| CORRECTION VALUE 12 | CORRECTION VALUE 11 | CORRECTION VALUE 10 | CORRECTION VALUE 9 |

GAP 1×DEFOCUS CHARACTERISTIC 1=CORRECTION VALUE 1
GAP 2×DEFOCUS CHARACTERISTIC 2=CORRECTION VALUE 2
:
GAP 12×DEFOCUS CHARACTERISTIC 12=CORRECTION VALUE 12

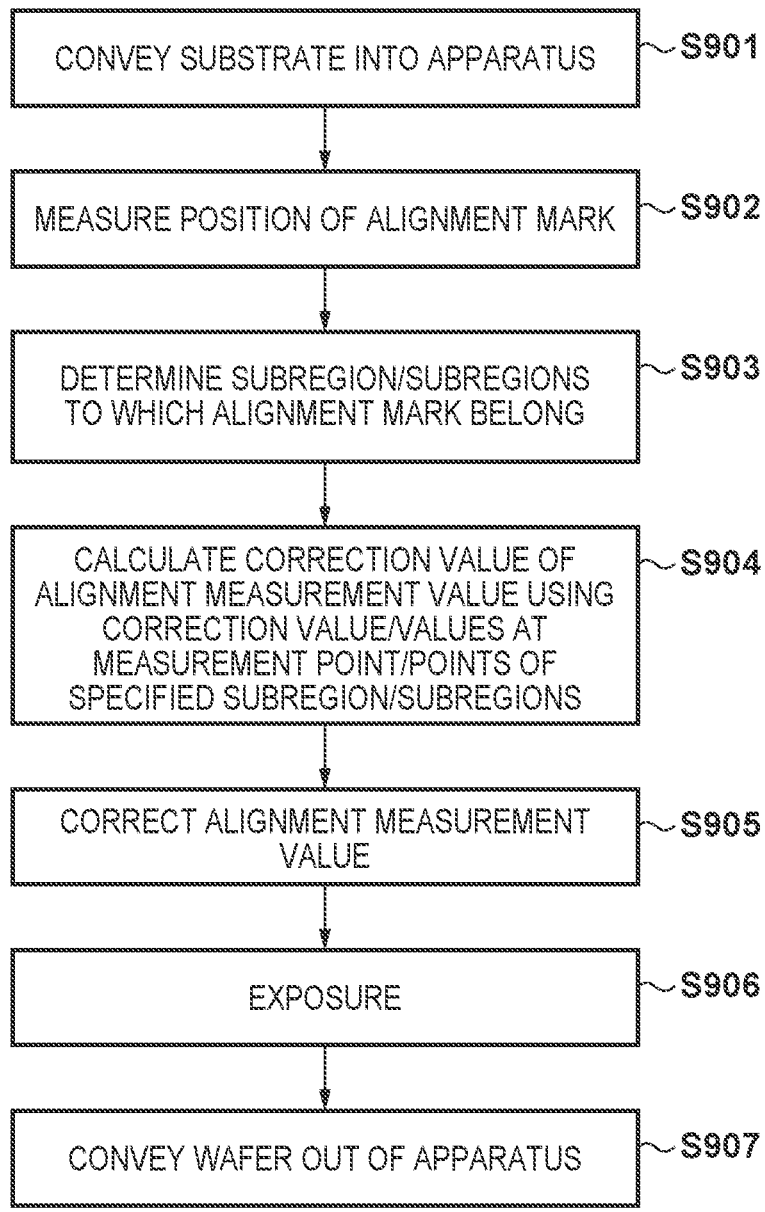

DETECTION APPARATUS, DETECTION METHOD, EXPOSURE APPARATUS, EXPOSURE SYSTEM, AND ARTICLE MANUFACTURING METHOD

BACKGROUND OF THE INVENTION

Field of the Invention

The present invention relates to a detection apparatus, detection method, exposure apparatus, exposure system, and article manufacturing method.

Description of the Related Art

Alignment of an object on a semiconductor exposure apparatus is usually performed by observing an alignment mark on the object (for example, a substrate) using a detection optical system and detecting the position of the alignment mark. The detection optical system may include a pre-alignment optical system having a wide observation field and a fine alignment optical system having a narrow observation field but high measurement accuracy. By first performing pre-alignment measurement using the pre-alignment optical system, roughly aligning the position of the mark, and then performing fine alignment measurement using the fine-alignment optical system, it is possible to achieve the alignment over a wide observation field with high measurement accuracy. Recently, with the down-sizing and the increase in the number of pixels of image sensors, it has become possible to realize high measurement accuracy while maintaining a wide observation field by using the pre-alignment optical system.

On the other hand, there is a defocus characteristic as a factor of an error that can be included in the alignment measurement using the detection optical system. The defocus characteristic is a characteristic that represents a fluctuating phenomenon of a position (measured value of an alignment mark) detected in the direction (XY direction) perpendicular to the optical axis depending on the focus position, which is a position in the optical axis direction (Z direction) of the detection optical system. If the alignment mark is measured with the defocus characteristic, the variation in the position of the alignment mark in the Z direction appears as the variation in the measurement direction, which may deteriorate the measurement reproducibility.

Japanese Patent Laid-Open No. 10-022211 discloses that a detection optical axis and an illumination optical axis are adjusted so as to prevent the defocus characteristic from occurring as much as possible. In Japanese Patent Laid-Open No. 10-022211, the defocus characteristic is adjusted with respect to a reference adjustment mark, and the position is detected on the premise that a mark that is actually aligned has the same defocus characteristic as the adjustment mark.

In the fine alignment measurement, in order to minimize the influence of the defocus characteristic, it is desirable to measure the alignment mark with the detection optical system focusing on the best focus position. However, when an attempt is made to perform the fine alignment measurement using the pre-alignment optical system having a wide observation field, it is not possible to focus on the entire observation field of the optical system. Therefore, even if the center of the observation field is in focus, the edge of the observation field of the optical system may be out of focus. In this case, the fine alignment measurement is performed not in the best-focused state, and there may be a problem that the measured value deviates due to the influence of the defocus characteristic. In a case where an underlayer is present in the process wafer, as the focus difference between the center and the edge of the observation field becomes large due to the gap caused by the underlayer, an effect of the defocus characteristic on the measured value is significant. Therefore, in Japanese Patent Laid-Open No. 2005-285916, after measuring the mark once, the wafer stage is moved so that the mark is located near the center of the field of the optical system, and the fine alignment measurement is performed again.

In the technique disclosed in Japanese Patent Laid-Open No. 10-022211, since it is not possible to follow the change in the position of the alignment mark and the change in the defocus characteristic at the edge of the observation field, there arises a problem that the alignment cannot be performed with high accuracy. Further, the method disclosed in Japanese Patent Laid-Open No. 2005-285916 requires a process of once moving the wafer stage so that the mark is located near the center of the observation field, and has a problem that it takes a long time to complete the alignment measurement.

SUMMARY OF THE INVENTION

The present invention provides, for example, a detection apparatus that is advantageous in achieving both accuracy and speed of detection process.

The present invention in its one aspect provides a detection apparatus that detects a mark formed on a substrate, comprising a stage that moves while holding the substrate, a detection optical system that irradiates light on the mark on the substrate held by the stage and detects an image of the mark, and a processor that performs a detection process of the mark based on the image of the mark detected by the detection optical system, wherein the processor is configured to find a detection value indicating a position of the mark in an observation field of the detection optical system based on the image of the mark detected by the detection optical system, find a subregion in which the mark is located among a plurality of subregions in the observation field, and correct the detection value based on a correction value corresponding to the found subregion among correction values predetermined for the plurality of subregions, respectively.

Further features of the present invention will become apparent from the following description of exemplary embodiments (with reference to the attached drawings).

BRIEF DESCRIPTION OF THE DRAWINGS

FIG. 8 is a diagram illustrating a process of creating a correction table.

FIG. 9 is a flowchart of a correction process of a fine alignment measurement value.

DESCRIPTION OF THE EMBODIMENTS

Figure 1:
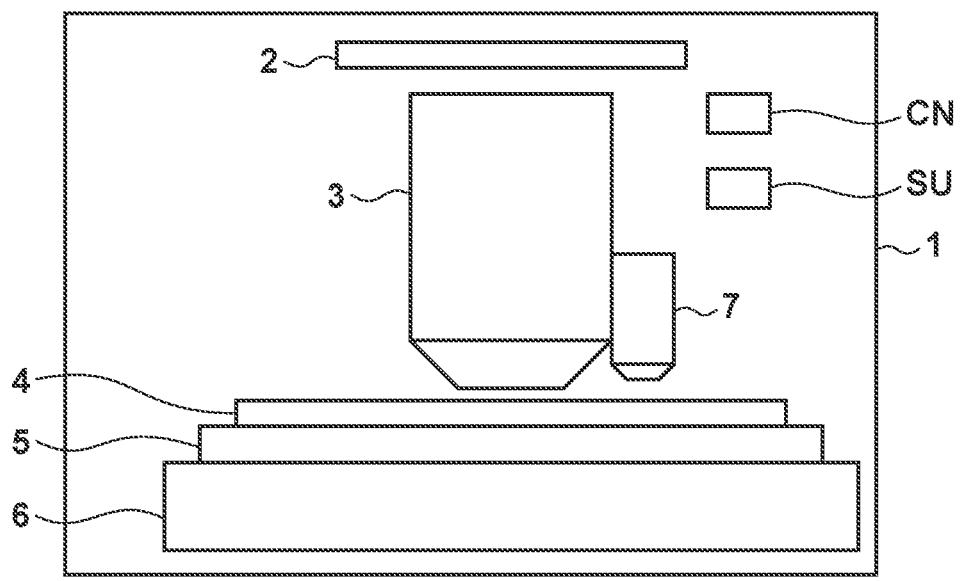
FIG. 1 is a diagram showing a configuration of an exposure apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a schematic view of an exposure apparatus according to an embodiment. In the present specification and drawings, the direction is shown in the XYZ coordinate system with the horizontal plane as an XY plane. Generally, a substrate 4 to be exposed is placed on a substrate stage 6 so that the surface of the substrate 4 is parallel to the horizontal plane (XY plane). Therefore, in the following, the directions orthogonal to each other in the plane along the surface of the substrate 4 are defined as an X-axis and a Y-axis, and the direction perpendicular to the X-axis and the Y-axis is defined as a Z-axis. Further, in the following, the directions parallel to the X-axis, Y-axis, and Z-axis in the XYZ coordinate system are referred to as X-direction, Y-direction, and Z-direction, respectively, and the rotation direction about the X-axis, the rotation direction about the Y-axis, and the rotation direction about the Z-axis are referred to as the θx direction, the θy direction, and the θz direction, respectively.

1. Configuration of Apparatus

FIG. 1 is a diagram showing a configuration of an exposure apparatus to which a detection apparatus is applied according to an embodiment. The exposure apparatus 1 has a projection optical system 3 that projects a pattern (for example, a circuit pattern) formed on an original plate 2. Further, the exposure apparatus 1 has a substrate chuck 5 for holding the substrate 4 and the substrate stage 6 for positioning the substrate 4 at a predetermined position. The exposure apparatus 1 further includes a detection optical system 7 that irradiates an alignment mark of the substrate 4 held by the substrate stage 6 with light and detects an image of the alignment mark. A pattern and the alignment mark are formed on the substrate 4 in the previous process.

A controller CN comprehensively controls each unit of the exposure apparatus. A storage unit SU stores a program and various data for the controller CN to execute the exposure process. The controller CN and the storage unit SU may be configured as a computer device including a CPU and a memory. Further, in the present embodiment, in particular, the controller CN may function as a processing unit that performs alignment mark detection process based on the image of the alignment mark detected by the detection optical system 7.

Figure 2:
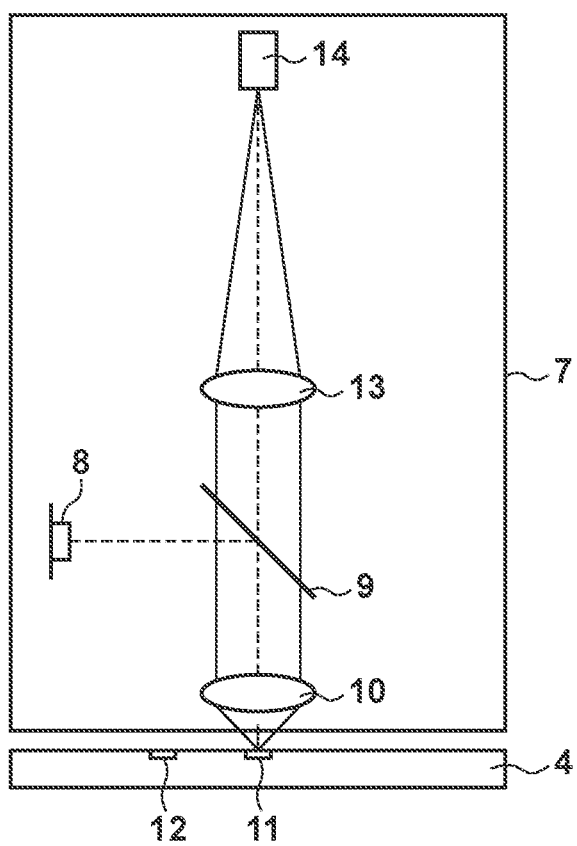
FIG. 2 is a diagram showing a configuration of a detection optical system.

FIG. 2 is a diagram showing a configuration of the detection optical system 7. The illumination light from a light source 8 is reflected by a beam splitter 9, passes through a lens 10, and illuminates a pre-alignment mark 11 on the substrate 4. The diffracted light from the pre-alignment mark 11 passes through the lens 10, the beam splitter 9, and a lens 13, and is received by a sensor 14. Here, the pre-alignment mark 11 is magnified by the lens 10 and the lens 13 by a predetermined magnification, and is imaged on the sensor 14. Conventionally, different magnifications have been set for pre-alignment measurement that targets a wide range and for fine alignment measurement that performs high-precision measurement, but in this embodiment, the "predetermined magnification" is a magnification that can be suitably used both in the pre-alignment measurement and the fine alignment measurement.

Figure 3:
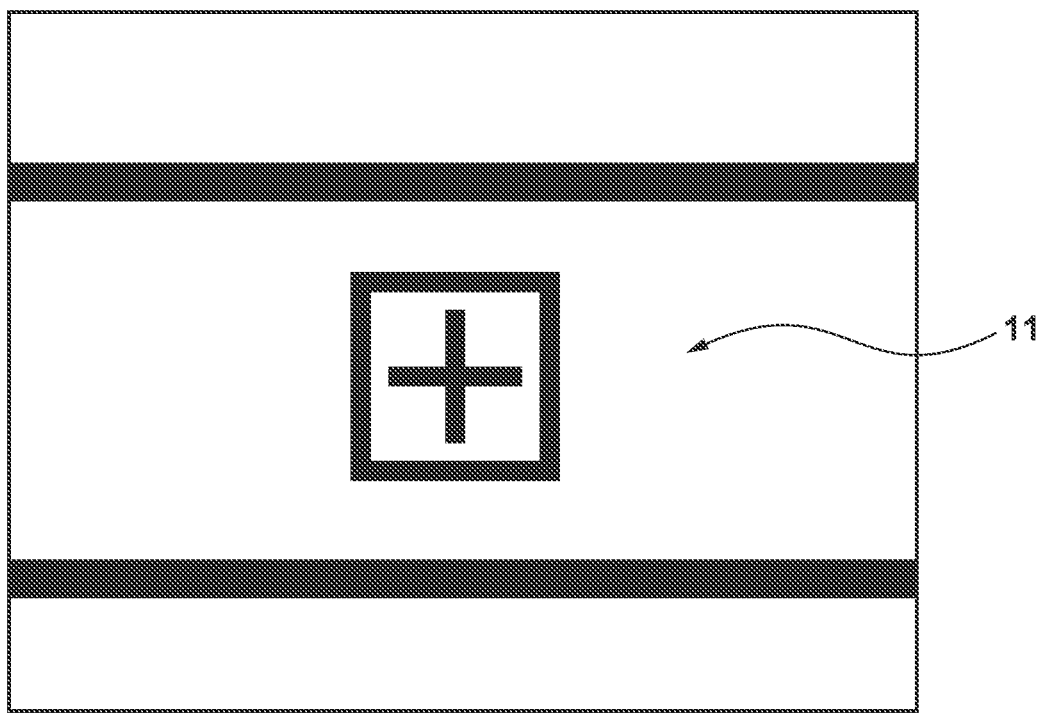
FIG. 3 is a diagram showing an example of a pre-alignment mark.
Figure 4:
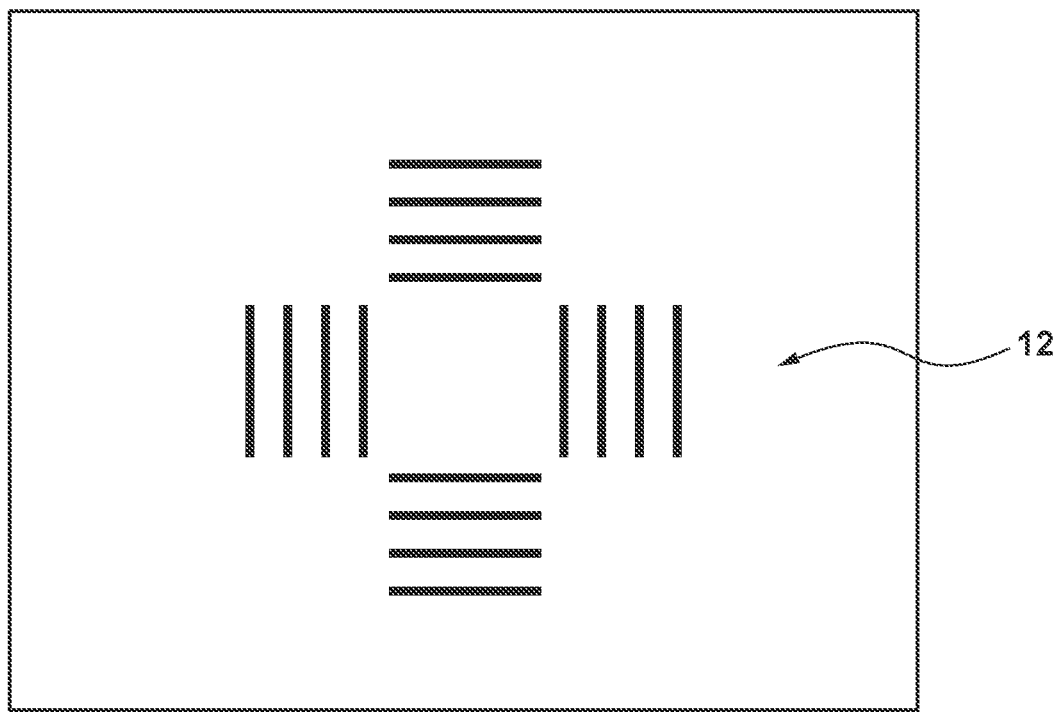
FIG. 4 is a diagram showing an example of a fine alignment mark.

FIG. 3 is a diagram showing an example of the pre-alignment mark 11, and FIG. 4 is a diagram showing an example of a fine alignment mark 12. The shapes of the pre-alignment mark 11 and the fine alignment mark 12 are not limited to those shown in the drawings. The shape of each alignment mark can vary depending on a stage in which a substrate process is and the like.

Although not specifically shown in FIG. 2, an AF (auto-focus) system (hereinafter referred to as "OA-AF system") is configured in the detection optical system 7. With this OA-AF system, the best focus position for the pre-alignment mark 11 or the fine alignment mark 12 can be calculated.

Figure 5:
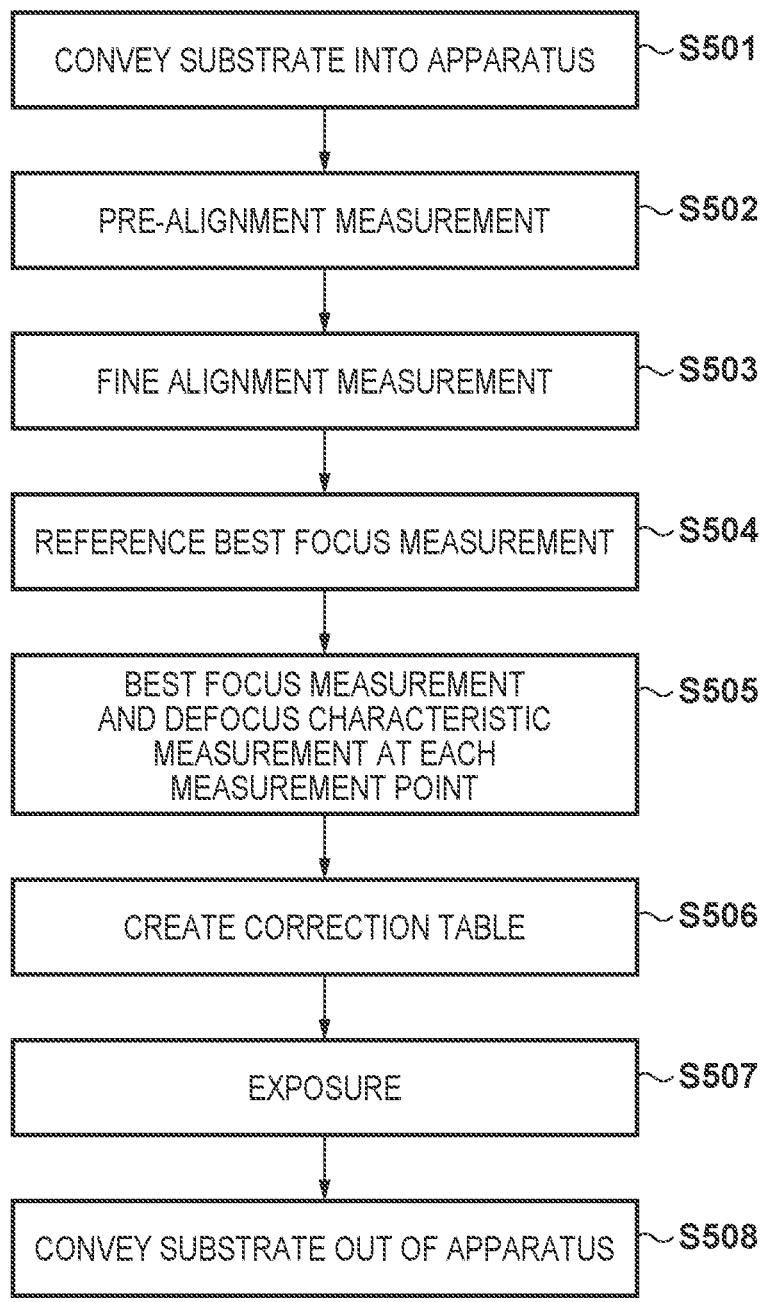
FIG. 5 is a flowchart of a measurement process of gap information and defocus characteristics.

2. Measurement of Gap Information and Defocus Characteristics in Observation Field FIG. 5 is a flowchart of an exposure process including a process of measuring gap information and defocus characteristics in an observation field in which the fine alignment mark can be detected. The exposure process according to this flowchart may be performed, for example, when the first substrate is exposed in each process.

In step S501, the controller CN controls a substrate conveyer (not shown) to convey a substrate into the exposure apparatus 1. The conveyed substrate is held by the substrate chuck 5.

In step S502, the controller CN (processing unit) calculates the position of the pre-alignment mark 11 on the substrate as the pre-alignment measurement. At this time, by detecting the pre-alignment mark 11 in a plurality of shot regions in the substrate, a shift amount of the entire substrate and a first-order linear component (magnification and/or rotation) are calculated.

Following the pre-alignment measurement in step S502, in step S503, the controller CN performs the fine alignment measurement. Here, the controller CN drives the substrate stage 6 to a position where the fine alignment mark 12 can be observed by the detection optical system 7 based on the result of the pre-alignment measurement, and the positions of the fine alignment mark 12 are detected in the plurality of shot regions. In the example of FIG. 4, the fine alignment mark 12 has a line-and-space pattern in which a plurality of lines are arranged at a predetermined interval in the X direction and a line-and-space pattern in which a plurality of lines are arranged at a predetermined interval in the Y direction. When the measurement direction is the X direction, the image of the fine alignment mark 12 acquired by the detection optical system 7 is integrated in the non-measurement direction (Y direction) to generate a one-dimensional waveform signal, and this signal is processed to find the position of the fine alignment mark 12 in the X direction. When the measurement direction is the Y direction, the image of the fine alignment mark 12 acquired by the detection optical system 7 is integrated in the non-measurement direction (X direction) to generate a one-dimensional waveform signal, and this signal is processed to find the position of the fine alignment mark 12 in the Y direction.

The controller CN then accurately calculates the shift amount and linear components (magnification and/or rotation) of the entire substrate. At this time, the controller CN may accurately calculate the higher-order deformation component of the substrate by measuring the position of the fine alignment mark 12 in a plurality of shot regions. This makes it possible to calculate the precise position of the mark in each shot region on the substrate.

Figure 6:
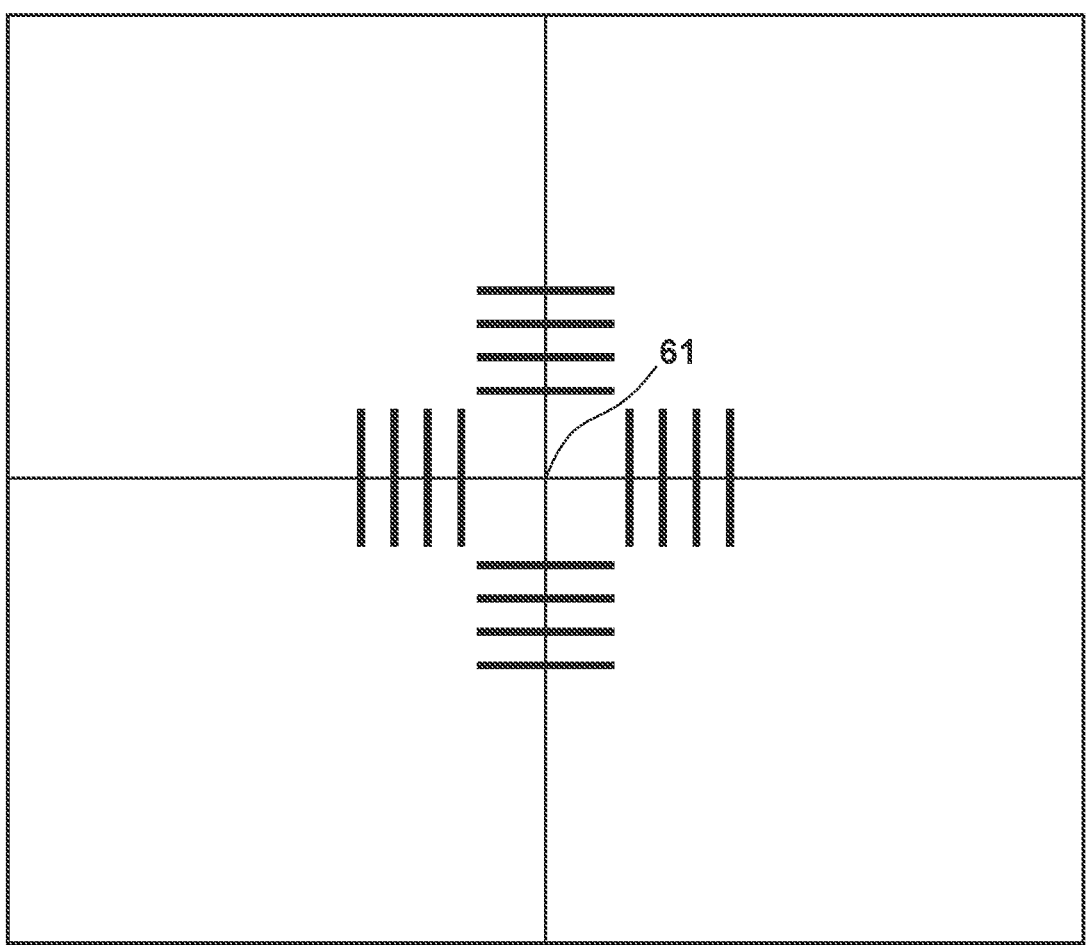
FIG. 6 is a diagram showing a state in which the fine alignment mark is located at the center of an observation field.

In step S504, the controller CN measures the best focus position (reference best focus measurement) of the fine alignment mark 12 at the center of the observation field of the detection optical system 7 using the OA-AF system. FIG. 6 shows a state in which the fine alignment mark 12 is arranged at a center 61 of the observation field. The best focus position measured at the center 61 of the observation field is determined as the reference position of the gap. In the following, this is referred to as the "reference best focus position", and this value is stored in the storage unit SU.

Figure 7:
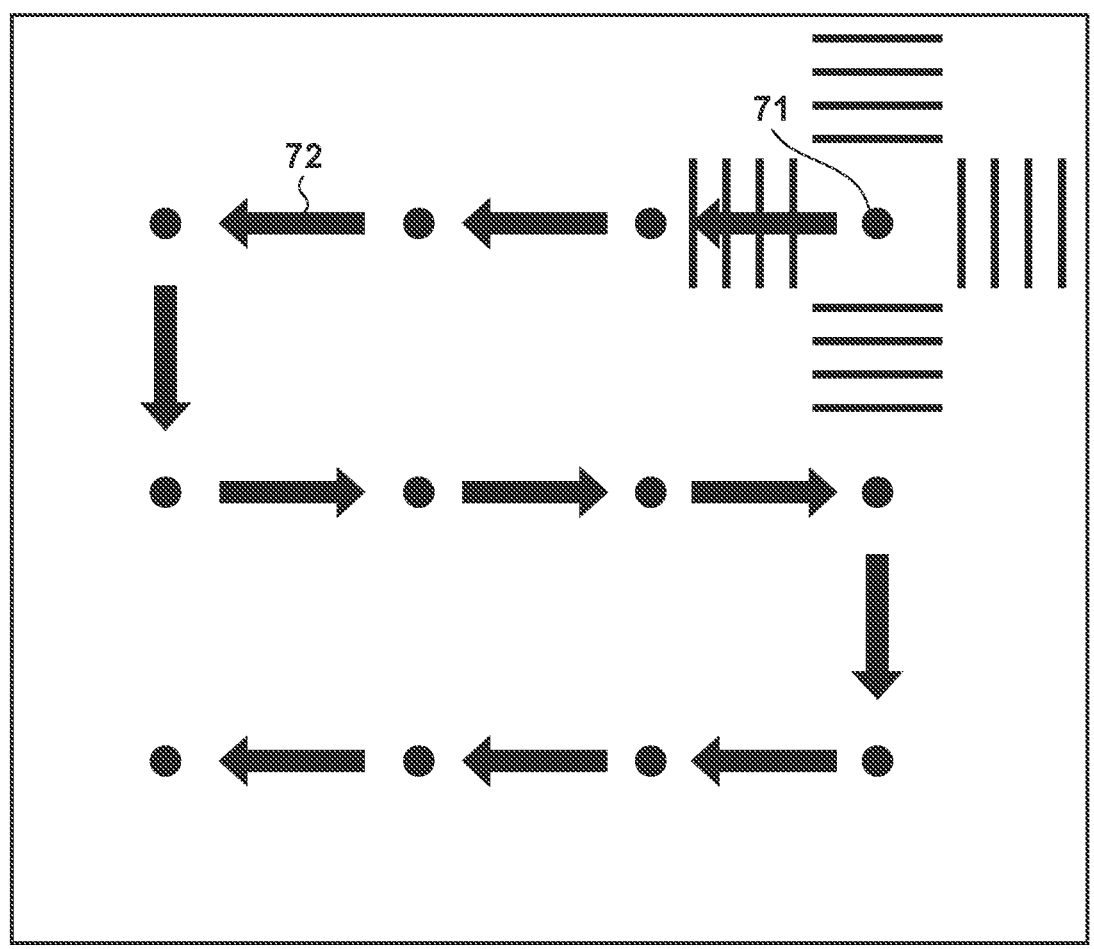
FIG. 7 is a diagram illustrating a process of measuring a best focus position and a defocus characteristic at each of a plurality of measurement points.

In step S505, the controller CN measures a best focus position and a defocus characteristic at each of a plurality of measurement points in the observation field. The defocus characteristic represents a phenomenon in which the position (measured value of the fine alignment mark 12) detected in the direction (XY direction) perpendicular to the optical axis (Z direction) fluctuates depending on the focus position (depending on the amount of defocus) which is the position in the optical axis direction of the detection optical system 7. In step S505, the controller CN moves the substrate stage 6 so that the center of the fine alignment mark 12 coincides with one of the plurality of measurement points (for example, a measurement point 71) in the observation field, as shown in FIG. 7. After that, the controller CN measures the best focus position and the defocus characteristic of the fine alignment mark 12 using the OA-AF system. Next, the controller CN moves the substrate stage 6 in the direction of an arrow 72 so that the center of the fine alignment mark 12 coincides with the next measurement point, and measures the best focus position and the defocus characteristic of the fine alignment mark 12. Similarly, the measurement of the best focus position and the defocus characteristic is performed at each of the plurality of measurement points in the observation field.

In step S506, the controller CN calculates a gap which is a difference between the best focus position at each measurement point and the reference best focus position, and creates gap information having values of the gap at the respective measurement points. Further, the controller CN obtains a correction value based on the gap and the defocus characteristic at each measurement point. For example, as shown in FIG. 8, the controller CN obtains the product of the gap and the defocus characteristic for each measurement point as a correction value. The controller CN creates a correction table showing the correspondence between the positions (XY coordinate values) of the plurality of measurement points and the correction values using the correction value obtained for each of the plurality of measurement points. Since the defocus characteristic is measured for each measurement direction (X direction, Y direction) of the fine alignment mark 12, a correction table in the X direction and a correction table in the Y direction can be created. The created correction table is stored in the storage unit SU. The above steps S502 to S506 are the correction table creation process.

In step S507, the controller CN exposes each shot region of the substrate. In step S508, the controller CN controls the substrate conveyer (not shown) to convey the substrate out of the exposure apparatus.

As described above, the exposure process according to this flowchart is performed, for example, when the first substrate is exposed in each process, but the correction table may be recreated in a case where the fine alignment mark 12 is changed or the positions of the measurement points are changed.

3. Correction Process of Fine Alignment Measurement Value

FIG. 9 is a flowchart of an exposure process that involves a correction process of a fine alignment measurement value. The exposure process according to this flowchart may be performed at the time of exposing the substrate, other than the time when the exposure process involving the measurement of the gap information and the defocus characteristic described above is performed.

In step S901, the controller CN controls the substrate conveyer (not shown) to convey a substrate into the exposure apparatus 1. The transferred substrate is held by the substrate chuck 5.

Figure 10:
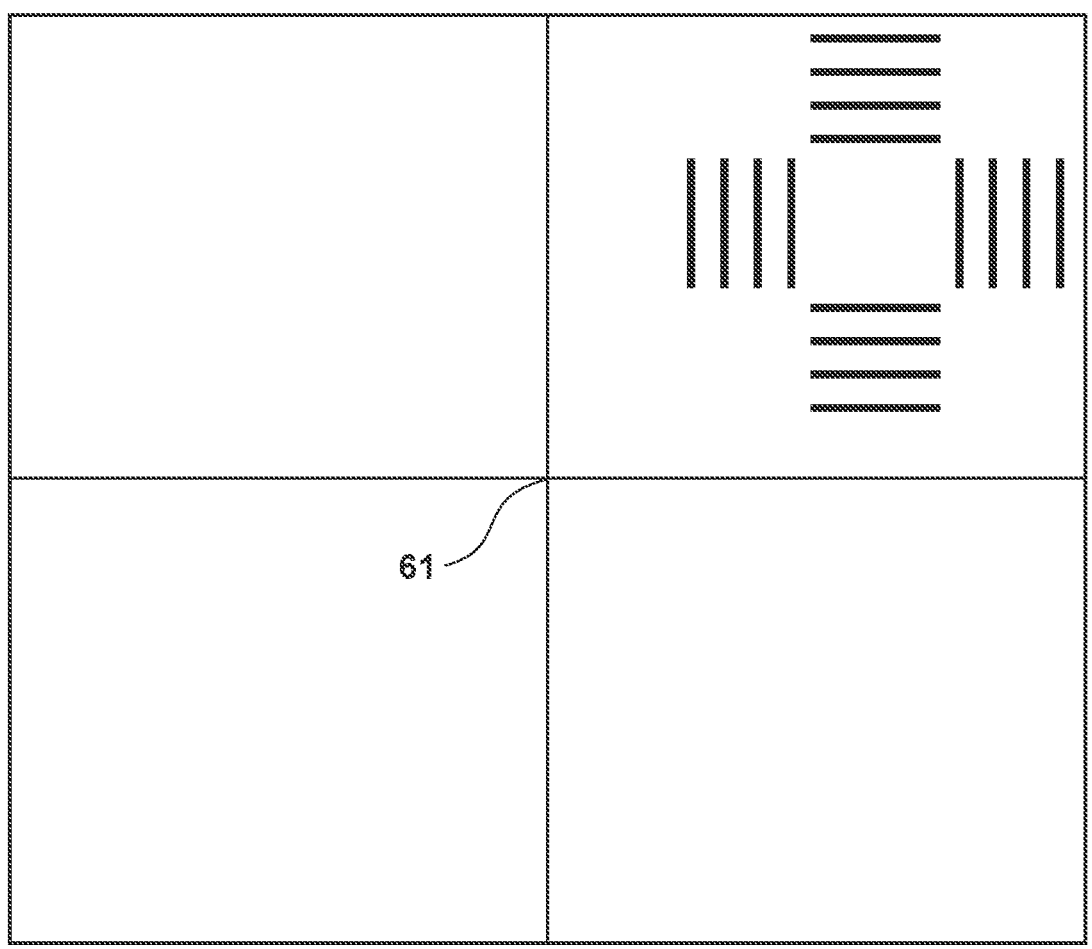
FIG. 10 is a diagram showing a state in which the fine alignment mark is located at the edge of the observation field.

In step S902, the controller CN measures the position of the fine alignment mark 12 without performing pre-alignment, that is, without aligning the fine alignment mark 12 at the center of the visual field. By this position measurement, a detection value (fine alignment measurement value) indicating the position of the fine alignment mark 12 in the observation field of the detection optical system 7 can be obtained. Since no pre-alignment is performed, it is not guaranteed that the fine alignment mark 12 as shown in FIG. 6 will be set at the center of the observation field of the detection optical system 7. Therefore, as shown in FIG. 10, a situation in which the fine alignment mark 12 is arranged at a position deviating from the center of the observation field may occur.

Figure 11:
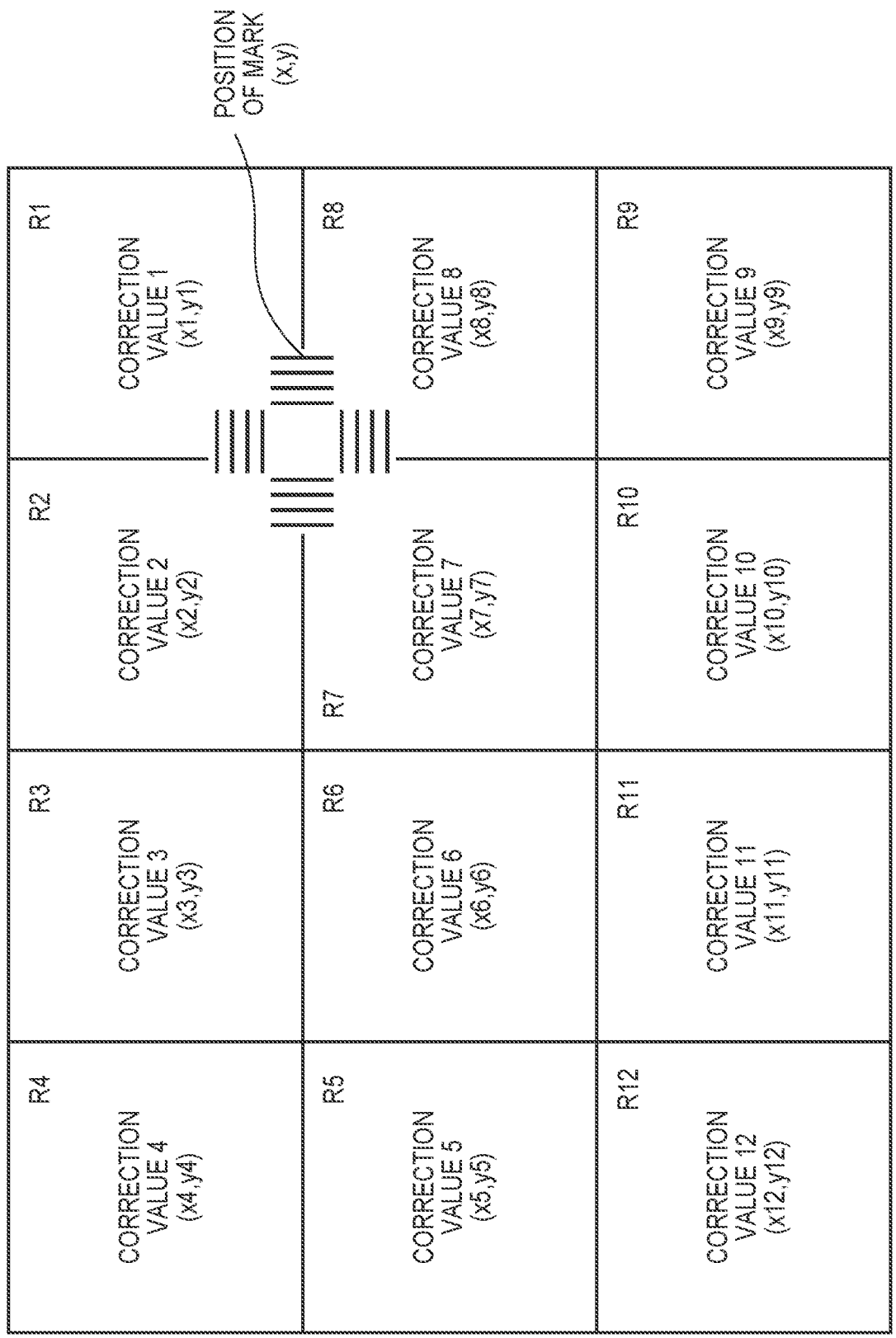
FIG. 11 is a diagram illustrating a process of identifying subregions to which the fine alignment mark belongs.

The observation field of the detection optical system 7 can be divided into a plurality of subregions each centered on each of the plurality of measurement points. In the example of FIG. 11, the observation field has 12 subregions represented by R1 to R12, and the correction value and the XY coordinate value of the measurement point are shown in each subregion. In an embodiment, each of the plurality of subregions may have a size that includes the fine alignment mark 12. However, the size of each of the plurality of subregions is not limited to the specific size associated with the fine alignment mark 12. In another embodiment, each of the plurality of subregions may be smaller than the fine alignment mark 12. In step S903, the controller CN identifies the subregion/subregions in which the fine alignment mark 12 is located among the plurality of subregions R1 to R12, based on the XY coordinate values of the fine alignment mark 12 measured in step S902. In the example of FIG. 11, the subregions where the fine alignment mark 12 is located are R1, R2, R7, and R8. The fine alignment mark 12 is surrounded by four points, i.e., a measurement point (x1, y1) of the subregion R1, a measurement point (x2, y2) of the subregion R2, a measurement point (x7, y7) of the subregion R7, and a measurement point (x8, y8) of the subregion R8.

In steps S904 and S905, the controller CN corrects the alignment measurement value based on the correction value/values of the subregion/subregions obtained in step S903 among the correction values each predetermined for each the plurality of subregions. For example, in step S904, the controller CN calculates a correction value of the fine alignment measurement value, which is the detection result of the mark, using the correction value/values of the measurement point/points of the subregion/subregions specified in step S903.

As described above, in the embodiment, each of the plurality of subregions has a size capable of including the fine alignment mark 12. When the center of the fine alignment mark 12 coincides with the center of one subregion, the correction value preset in that subregion can be taken as the correction value of the fine alignment mark 12. If the center of the fine alignment mark 12 does not coincide with the center of one subregion, the fine alignment mark 12 will be located across two or more subregions. The example shown in FIG. 11 represents this situation. In this case, the correction value of the fine alignment measurement value is obtained by taking a weighted average of the correction values of the measurement points of the subregions specified in step S903.

Figure 12:
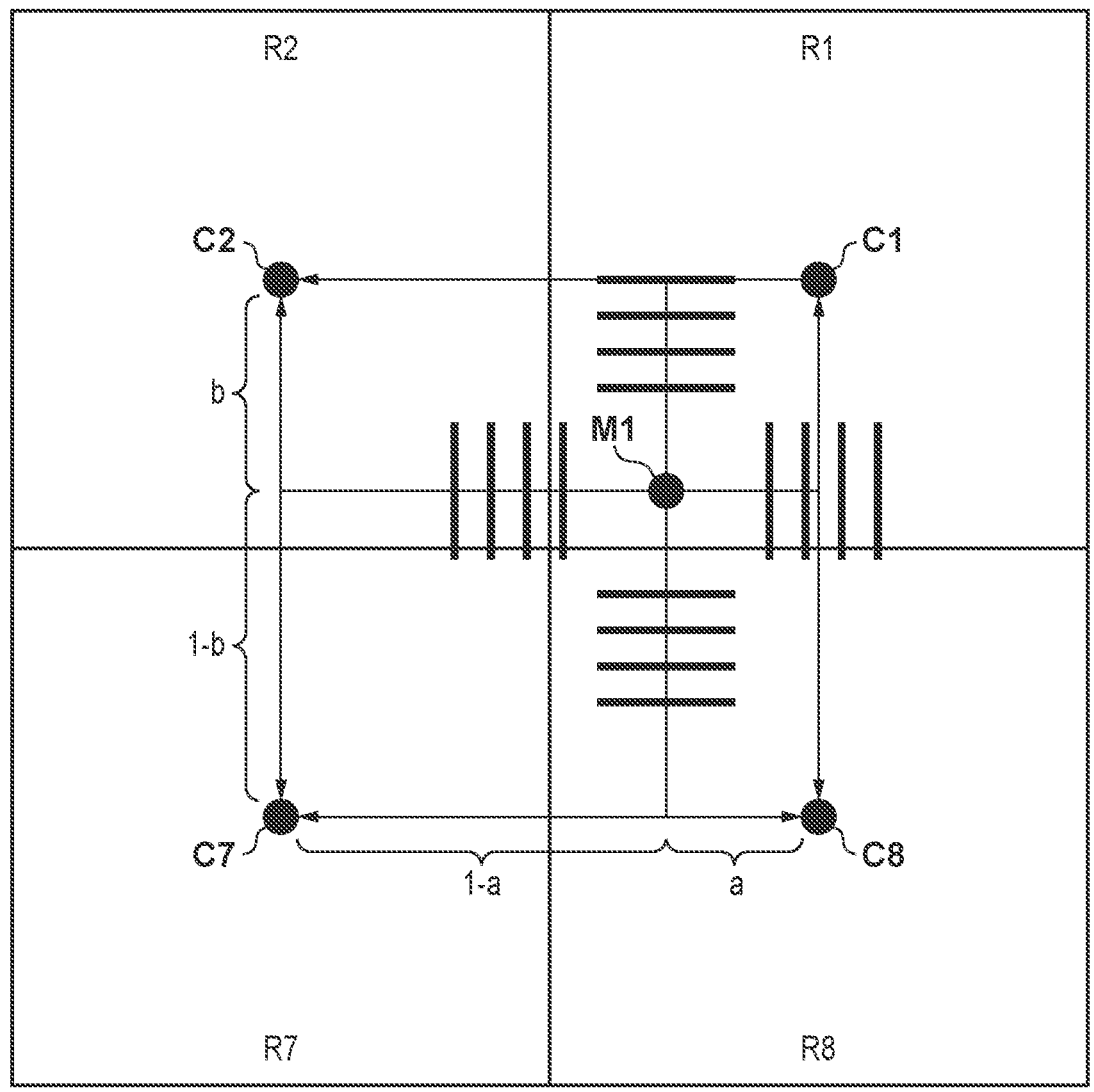
FIG. 12 is a diagram illustrating a method of calculating a correction value of the fine alignment measurement value.

A method of calculating the correction value of the fine alignment measurement value will be described with reference to FIG. 12. Here, let the center of the fine alignment mark 12 be M1. Further, let the correction values 1, 2, 7, and 8, of the subregions R1, R2, R7, and R8 to which the fine alignment mark 12 belongs be C1 (xc1, yc1), C2 (xc2, yc2), C7 (xc7, yc7), and C8 (xc8, yc8), respectively. First, the controller CN finds the subregion (first subregion) in which the center M1 of the fine alignment mark 12 is located. In the example of FIG. 12, the subregion in which the center M1 of the fine alignment mark 12 is located is the subregion R1. Next, the controller CN finds a corrected correction value by taking a weighted average of the predetermined correction values of the subregions R1, R2, R7, and R8 with weights according to the amount of misalignment between the center M1 of the fine alignment mark 12 and the center of the subregion R1. From the amount of misalignment between the center M1 of the fine alignment mark 12 and the center of the subregion R1, a ratio representing the position of M1 in the X direction and a ratio b representing the position of M1 in the Y direction in the rectangular region having the measurement points surrounding the center M1 as its vertices can be obtained. As described above, since the correction table is created for each measurement direction, the corrected correction values are also obtained for the X direction and the Y direction. The corrected correction value for the fine alignment mark 12 in the X direction is obtained by using the following equation.

$$(1-b)*(xc1*(1-a)+xc2*a)+b*(xc7*a+xc8*(1-a))$$

Further, the corrected correction value for the fine alignment mark 12 in the Y direction is obtained by using the following equation.

$$(1-a)*(yc1*(1-b)+yc8*b)+a*(yc7*b+yc2*(1-b))$$

Next, in step S905, the controller CN corrects the fine alignment measurement value using the corrected correction value calculated in step S904. Note that the corrected correction value calculated in step S904 is not limited to the weighted average value. For example, when the measurement accuracy of each correction value is low, the plane approximation using the correction value table may be used. After the correction of the fine alignment measurement value is completed, the controller CN precisely calculates a shift amount and a first-order linear component (magnification and/or rotation) of the entire substrate from the corrected fine alignment measurement value.

Then, in step S906, the controller CN exposes each shot region of the substrate. In step S907, the controller CN controls the substrate conveyer (not shown) to convey the substrate out of the exposure apparatus.

According to the above exposure process, a process of aligning the fine alignment mark 12 to the center of the observation field is not performed, and even if the fine alignment mark 12 is measured when it is at the edge of the observation field of the detection optical system 7, it is possible to perform highly accurate measurement without being affected by the defocus characteristics.

It should be noted that this embodiment can be applied to both an image detection method and a diffracted light detection method.

Second Embodiment

In the above-described first embodiment, a method of creating a correction table for each process and correcting the fine alignment measurement value using the correction table at the time of exposure has been described. In the second embodiment, sharing gap information between apparatuses when creating a correction table will be described.

Figure 13:
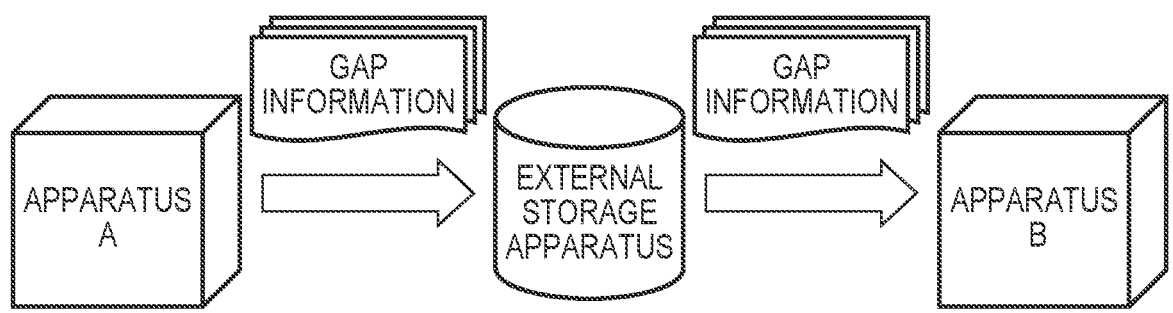
FIG. 13 is a configuration diagram of an exposure system that shares gap information between apparatuses.

FIG. 13 is a configuration diagram of an exposure system that shares gap information among a plurality of exposure apparatuses. The exposure system includes a plurality of exposure apparatus, each having the above-described detection apparatus. There are cases where the gap information around the fine alignment mark 12 are stable for the same process. In that case, without performing the best focus measurement at a plurality of measurement points in each of a first exposure apparatus (apparatus A) and a second exposure apparatus (apparatus B) in the same manner, the gap information obtained by the measurement in the apparatus A can be used in the apparatus B. The gap information generated by the measurement in the apparatus A is stored in an external storage apparatus. The apparatus B can access the external storage apparatus to acquire and use the gap information of the same process.

By sharing the gap information among the plurality of exposure apparatuses in this way, it is possible for the apparatus B to omit the best focus measurement at the plurality of measurement points, and improvement of the productivity can be expected.

Embodiment of Article Manufacturing Method

The article manufacturing method according to the embodiment of the present invention is suitable for manufacturing articles such as microdevices such as semiconductor devices and elements having a fine structure, for example. The article manufacturing method of the present embodiment includes a step of forming a latent image pattern on a photosensitive agent applied to a substrate by using the above exposure apparatus (a step of exposing the substrate), and a step of developing the substrate on which the latent image pattern is formed in the above step. Further, such a manufacturing method includes other well-known steps (oxidation, film formation, vapor deposition, doping, flattening, etching, resist peeling, dicing, bonding, packaging, etc.). The article manufacturing method of the present embodiment is advantageous in at least one of the performance, quality, productivity, and production cost of the article as compared with the conventional method.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-203655, filed Dec. 8, 2020, which is hereby incorporated by reference herein in its entirety.

What is claimed is:

1. A detection apparatus for detecting a mark formed on a substrate, the detection apparatus comprising:
   a detection optical system that irradiates light on the mark on the substrate and detects an image of the mark; and
   a processor that performs a detection process of the mark based on the image of the mark detected by the detection optical system,
   wherein the processor is configured to:
   find a position of the mark in an observation field of the detection optical system based on the image of the mark detected by the detection optical system; and
   correct the position of the mark based on a correction value for the position of the mark among correction values calculated for each of a plurality of positions within the observation field based on a height of the substrate and a characteristic of the detection optical system.

2. The detection apparatus according to claim 1, wherein, in a case where the mark is located across two or more subregions, among a plurality of subregions within the observation field, the processor is configured to:
   find a first subregion that is a subregion in which a center of the mark exists;
   find a corrected correction value by taking a weighted average of the correction values, each of which is predetermined for each of the two or more subregions using weights depending upon an amount of positional shift between the center of the mark and a center of the first subregion; and
   correct the position of the mark using the corrected correction value.

3. The detection apparatus according to claim 1, wherein the controller is configured to:
   perform a creation process of creating a correction table showing relationship between positions of a plurality of measurement points and the correction values set for a plurality of subregions within the observation field, respectively, and
   find the correction values for the plurality of subregions, respectively, based on the correction table created in advance by the creation process,
   wherein the creation process includes:
   measuring a best focus position of a fine alignment mark at the center of the observation field of the detection optical system and determining the measured best focus position as a reference position;
   measuring a best focus position of the fine alignment mark and the characteristic of the detection optical system at each of the plurality of the measurement points;
   finding a correction value based on a gap, which is a difference between the measured best focus position and the reference position, and the characteristic of the detection optical system, for each of the plurality of measurement points; and
   creating the correction table using the correction values each found for each of the plurality of measurement points.

4. The detection apparatus according to claim 3, further comprising:
   a stage that moves while holding the substrate,
   wherein the creation process further includes a process of performing pre-alignment measurement and fine alignment measurement subsequent to the pre-alignment measurement, and
   wherein after moving the stage based on a result of the fine alignment measurement, measurement of the best focus position of the fine alignment mark is performed at the center of the observation field of the detection optical system.

5. The detection apparatus according to claim 3, wherein the characteristic of the detection optical system shows a characteristic that a measured value of the fine alignment mark fluctuates depending on a defocus amount of the detection optical system.

6. A detection method of detecting a position of a mark using a detection optical system that irradiates light on the mark formed on a substrate and detects an image of the mark, the method comprising:
   finding a position of the mark in an observation field of the detection optical system based on the image of the mark detected by the detection optical system; and
   correcting the position of the mark based on a correction value of the position of the mark among correction values calculated for each of a plurality of positions within the observation field based on a height of the substrate and a characteristic of the detection optical system.

7. An exposure apparatus that exposes a substrate comprising:
   a detection apparatus according to claim 1, wherein the exposure apparatus exposes the substrate after correcting a detection result of the mark formed on the substrate by the detection apparatus.

8. An exposure system that includes a plurality of exposure apparatuses each having a detection apparatus according to claim 3, wherein information on the gap created in one of the plurality of exposure apparatuses is shared by the plurality of exposure apparatuses.

9. An article manufacturing method comprising:
a first step of exposing a substrate using the exposure apparatus according to claim 7; and
a second step of developing the substrate exposed in the first step,
a third step of manufacturing an article from the substrate developed in the second step.

* * * * *